(12) United States Patent
Fink et al.

(10) Patent No.: US 12,031,924 B2
(45) Date of Patent: Jul. 9, 2024

(54) MEASUREMENT ARRANGEMENT FOR X-RAY RADIATION FOR GAP-FREE 1D MEASUREMENT

(71) Applicant: Bruker AXS GmbH, Karlsruhe (DE)

(72) Inventors: Jürgen Fink, Elchesheim-Illingen (DE); Christian Maurer, Karlsruhe (DE); Lutz Brügemann, Durmersheim (DE); Cristian Venanzi, Karlsruhe (DE)

( * ) Notice: Subject to any disclaimer, the term of this patent is extended or adjusted under 35 U.S.C. 154(b) by 22 days.

(21) Appl. No.: 17/432,676

(22) PCT Filed: Feb. 18, 2020

(86) PCT No.: PCT/EP2020/054162
§ 371 (c)(1),
(2) Date: Aug. 20, 2021

(87) PCT Pub. No.: WO2020/169559
PCT Pub. Date: Aug. 27, 2020

(65) Prior Publication Data
US 2022/0034825 A1 Feb. 3, 2022

(30) Foreign Application Priority Data
Feb. 22, 2019 (DE) ...................... 10 2019 202 442.4

(51) Int. Cl.
*G01N 23/20008* (2018.01)
*G01N 23/207* (2018.01)

(52) U.S. Cl.
CPC ..... *G01N 23/20008* (2013.01); *G01N 23/207* (2013.01); *G01N 2223/501* (2013.01)

(58) Field of Classification Search
CPC ........... G01N 23/20008; G01N 23/207; G01N 2223/501; G01N 2223/62
See application file for complete search history.

(56) References Cited

U.S. PATENT DOCUMENTS 5,812,629 A 9/1998 Clauser
2002/0018543 A1* 2/2002 Danielsson ............... G01T 1/24
378/154

(Continued)

FOREIGN PATENT DOCUMENTS

CN 1642479 A 4/2008
CN 102597807 A 7/2012

(Continued)

OTHER PUBLICATIONS

Willmott et al. "The Materials Science beamline upgrade at the Swiss light Source", J. Synchrotron Rad. (2013). 20, p. 667-682. (Year: 2013).*

(Continued)

*Primary Examiner* — David P Porta
*Assistant Examiner* — Mamadou Faye
(74) *Attorney, Agent, or Firm* — Benoît & Côté, Inc.

(57) ABSTRACT

In summary, the present invention proposes embodying an X-ray detector (21) with a plurality of detector modules (1, 1a-1g), each comprising dead zones (6) without X-ray sensitivity and active zones (3, 3a-3c) with X-ray sensitivity that is spatially resolved in a measurement direction (MR), wherein the detector modules (1, 1a-1g) are embodied successively and in an overlapping fashion along the measurement direction (MR), such that in overlap regions (23a-23e) the dead zone (6) of one detector module (1, 1a-1g) is bridged by an active zone (3, 3a-3c) of another detector module (1, 1a-1g). The overlapping detector modules (1, 1a-1g) are arranged next to one another in the transverse direction (QR) in the overlap regions (23a-23e), wherein the transverse direction (QR) runs transversely with respect to the local measurement direction (MR) and transversely with respect to a local connection direction (VR) with respect to a sample position (91). The X-ray detector (21) makes it (Continued)

possible, in a simple manner, to obtain gapless, one-dimensional measurement information, in particular X-ray diffraction information, from a measurement sample (96) at the sample position (91).

20 Claims, 12 Drawing Sheets

(56) References Cited

U.S. PATENT DOCUMENTS

| | | |
|---|---|---|
| 2004/0141588 A1 | 7/2004 | Francke et al. |
| 2007/0019784 A1* | 1/2007 | Ting .................. G21K 1/10 378/21 |
| 2008/0135765 A1 | 6/2008 | Vydrin |
| 2010/0054415 A1* | 3/2010 | Olivo .................. G01N 23/041 378/85 |
| 2010/0150305 A1 | 6/2010 | Nowak et al. |
| 2010/0204942 A1 | 8/2010 | Danielsson |
| 2012/0148015 A1 | 6/2012 | Simon |
| 2014/0284752 A1* | 9/2014 | Kalliopuska ........ H01L 27/1467 257/448 |
| 2017/0097309 A1 | 4/2017 | Yoneda et al. |
| 2017/0328845 A1 | 11/2017 | Loeffler et al. |
| 2019/0064371 A1* | 2/2019 | Cao .................. G01T 1/1645 |

FOREIGN PATENT DOCUMENTS

| | | |
|---|---|---|
| CN | 102599926 A | 7/2012 |
| CN | 102224434 A | 2/2014 |
| DE | 102009045092 A1 | 12/2010 |
| DE | 102015101902 A1 | 8/2016 |
| EP | 3243575 A1 | 11/2017 |
| WO | 2007014099 A2 | 2/2007 |

OTHER PUBLICATIONS

Willmott, P.R. et al., "The Materials Science beamline upgrade at the Swiss Light Source", Journal of Synchrotron Radiation, Issue 20, No. 5, Sep. 2013.
Schmitt B. et al., "Mythen detector system", Nuclear Instruments & Methods in Physics Research., Section A, Elsevier BV, Issue 501, No. 1,21, Mar. 2003.
Du, Rong, et al., "Application of Mythen detector: In-situXRD study on the thermal expansion behavior of metal indium", Science China Physics, Mechanics & Astronomy, Science China Press, Issue 59, No. 7, Mar. 2016.
International Tables for Crystallography, vol. H, Powder Diffraction, Wiley Publishing, Sep. 2019.
Broennimann et al., "The Pilatus 1M detector", J Synchrotron Radiat. Mar. 2006, 13(Pt 2):120-30.
FCT ACTech, "Continuous on Stream Mineral Analyser", 2016.
Lutz, Gerhard, "Semiconductor Radiation Detectors", Device Physics, Springer, Chapter 6 (Detectors for Postion and Energy Measurement), 1999.
Lutz, Gerhard, "Semiconductor Radiation Detectors", Device Physics, Springer, Chapter 8 (The Integration of Detectors and Their Electronics), 1999.
Knoll, Glenn F., "Radiation Detection and Measurement", John Wiley & Sons, p. 190, 1979.
Inel Curved Position Sensitive Detector, 2017.
Griffiths, J.A. et al.,"A Multi-Element Detector Systems for Intelligent Imaging: I-ImaS", IEEE Nuclear Science Symposium Conference Record, 2006.
Rigaku Corp., Curved Photon Counting X-ray Detector, HyPix-Arc 150°, 2019.
Rigaku Corp., Portable stress analyzer, SmartSite RS, 2019.
Soleil Synchrotron, "A new detector on DIFFABS for fast measurements of X-ray diffraction images", 2019.
Thermo Fisher Scientific, Thermo Scientific ARL Equinox X100, X-ray Diffractometers, 2018.
Göbel, H.E., Neff, H., "Entwicklung von Detektoren für Röntgenstrahlen". Heuck F.H.W., Macherauch E. (eds) Forschung mit Röntgenstrahlen. Springer, Berlin, Heidelberg. https://doi.org/10.1007/978-3-642-78841-3_26, (1995).
Spieß, Lothar, et al., "Moderne Röntgenbeugung—Röntgendiffraktometrie für Materialwissenschaftler, Physiker und Chemiker" Viewweg+Teubner Aufl., XIV, 564 S. 338 (2009).
"Xstress 3000 G3/G3R"—Nova Instruments, stresstech.com [retrieved on Aug. 9, 2021], retrieved from internet: <URL: https://www.stresstech.com/products/xstress/xstress-g3/.
Elkaïm, Erik, "Résolution de structures à partir de diagrammes de diffraction de poudres (Structure Resolution From Powder Diffraction Patterns)", 2016.

* cited by examiner

MEASUREMENT ARRANGEMENT FOR X-RAY RADIATION FOR GAP-FREE 1D MEASUREMENT

BACKGROUND OF THE INVENTION

The invention relates to a measurement arrangement for X-ray radiation, comprising a sample position illuminatable by an X-ray beam, and an X-ray detector for detecting the X-ray radiation emanating from the sample position, comprising a plurality of detector modules, wherein the detector modules each have at least one active zone, in which X-ray radiation can be detected, and a dead zone, in which no X-ray radiation can be detected and which encloses the at least one active zone, wherein the detector modules are arranged successively in groups and/or individually in relation to a measurement direction, wherein the active zones of the detector modules are configured in each case for X-ray radiation detection which is spatially resolved in the measurement direction, and wherein the totality of the active zones of all the detector modules of the X-ray detector has an extent AM in the measurement direction and an extent AQ in a transverse direction, where AM≥5*AQ, wherein the transverse direction runs locally transversely with respect to the measurement direction and locally transversely with respect to a connection direction with respect to the sample position.

Such a measurement arrangement was disclosed by B. Schmitt et al., Nuclear Instruments and Methods in Physics Research A 501 (2003), 267-272 "Mythen detector system".

X-ray radiation can be used for nondestructive examination of the crystal structure of a sample to be measured. In this case, the X-ray radiation is diffracted at the lattice planes of the crystals in the sample or the associated atoms. The crystal structure or properties of the sample to be examined can be deduced from the spatial distribution of the diffracted X-ray radiation.

Various types of X-ray detectors are used for detecting X-rays. Zero-dimensional X-ray detectors allow the detection of X-rays in just a very small solid angle range; therefore, during the measurement the X-ray detector is typically scanned over a solid angle range of interest, for instance using a goniometer. One-dimensional detectors allow spatially resolved detection of X-ray radiation along one spatial direction ("measurement direction"). Two-dimensional detectors even allow spatially resolved detection along two spatial directions, but are comparatively expensive.

One important type of X-ray diffraction measurement is the examination of powder samples using an X-ray beam, wherein so-called Debye rings occur in the diffraction image. Said rings each represent specific lattice spacings in the crystal. On account of the random orientation of the individual grains in a powder sample with respect to the incident X-ray beam, each grain diffracts the X-ray beam through the corresponding lattice planes to a predefined location of the associated Debye ring, and the Debye ring is illuminated substantially uniformly by the totality of the diffracting powder grains. Accordingly, the information about the powder sample is already contained in a small circumferential portion of the Debye rings.

For the evaluation of a diffraction image of a powder sample ("powder diffractogram"), the spatially resolved evaluation of the diffraction image along an arbitrary radial direction across the Debye rings is therefore sufficient. A one-dimensional X-ray detector can be used for this purpose.

It should be noted that for other types of X-ray measurements, too, one-dimensional measurement information may be sufficient for obtaining desired information about a sample.

A detector module for a typical one-dimensional X-ray detector comprises an active zone and a dead zone surrounding the active zone. If an X-ray quantum impinges on the active zone, it is detected. If an X-ray quantum impinges on the dead zone, then it is not detected. The dead zone is necessary in practice in order to set up the physical structures for the active zone. The active zone of the detector module is usually embodied as longer along a measurement direction, in which the active zone allows a spatial resolution, compared with transversely with respect to this direction.

Typical detector modules for one-dimensional X-ray detectors can be embodied as semiconductor detector modules in which the active zone is subdivided into (often strip-shaped) sensor elements that achieve a spatial resolution, cf. for example G. Lutz, "Semiconductor Radiation Detectors—Device Physics", Springer-Verlag Berlin, $2^{nd}$ edition 2007, pages 109-111 and 229-233.

Other typical detector modules for one-dimensional X-ray detectors can be embodied as gas detectors (also referred to as a gas-filled proportional detector) in which an X-ray quantum triggers a charge pulse that passes to opposite edges of the active zone, such that the impingement location at the gas detector can be deduced from the propagation time difference, cf. for example G. F. Knoll, "Radiation Detection and Measurement", John Wiley and Sons, Inc., New York, Second Edition 1989, page 190, or else F. H. W. Heuck, E. Macherauch, "Forschung mit Röntgenstrahlen Bilanz eines Jahrhunderts (1895-1995)" ["Conclusions drawn from a century of research with X-rays (1895-1995)"], Springer-Verlag Berlin 1995, pages 359-360. An arcuate gas detector has also been disclosed for example in L. Spieß et al., "Moderne Röntgenbeugung—Röntgendiffraktometrie für Materialwissenschaftler, Physiker and Chemiker" ["Modern X-ray diffraction—X-ray diffractometry for materials scientists, physicists and chemists"], B. G. Teubner Verlag/GWV Fachverlage GmbH, Wiesbaden 2005, FIG. 4.23 (page 126). Corresponding X-ray diffractometers are known for example from the ARL EQUINOX 100 Benchtop x-ray diffractometer from Thermo Fisher Scientific, cf. company publication "Thermo Scientific ARL EQUINOX 100 X-ray diffractometers", 11/2018, or else from the FCT-ACTech Continuous On Stream Mineral Analyser COSMA, cf. http://www.fct-actech.com/site/pages/equipment.php, downloaded on Feb. 8, 2019; these can be equipped with curved spatially resolving detectors such as are available from INEL Inc., Stratham NH, USA, cf. http://www.inel.us/index.php/accessories-xrd-inel-company/detector-curved-inel-company, downloaded on Feb. 8, 2019. However, the global count rate of gas detectors is limited (usually around 1 Mcps), and in comparison with semiconductor-based detector modules gas detectors have a poorer spatial resolution and energy resolution and in addition limited durability.

In order to cover measurement regions that are longer than the active zone of an individual detector module, it is possible to move the detector module during the measurement. However, this is time-consuming in terms of apparatus and prolongs the measurement duration.

From the measurement arrangement "Mythen detector system" from B. Schmitt et al., loc. cit., it is known to arrange twelve planar semiconductor-based detector modules one behind another on a circular arc, such that the detector modules overall can simultaneously measure an angular range approximately twelve times greater than what can be measured by an individual detector module.

In the case of this arrangement, however, the measurement of the diffraction image along the circular arc has gaps in the region of the dead zones respectively surrounding the active zones of the detector modules. Diffraction information from the region of the gaps accordingly has to be dispensed with, or else the detector modules have to be offset along the circular arc and the measurement then has to be repeated in order to obtain complete diffraction information.

The arc detector CirPAD from imXPAD in cooperation with Synchrotron SOLEIL, Gif-sur-Yvette, France, has disclosed an X-ray detector in which the detector modules are arranged along a circular arc, wherein the arrangement is intended to enable reduced module spacings, cf. https://www.synchrotron-soleil.fr/en/news/new-detector-diffabs-fast-measurements-x-ray-diffraction-images, downloaded on Feb. 7, 2019. The CirPAD detector is also mentioned in the presentation "Résolution de structures à partir de diagrammes de diffraction de poudres", Erik Elkaim, Ecole de Cristallographie 17.-21. October 2016, transparency 12 therein.

Ch. Broennimann et al., J. Synchrotron Rad. (2006). 13, 120-130 "The PILATUS 1M Detector" have likewise disclosed an X-ray detector in which a partial overlap of detector modules is set up by arranging the detector modules one behind another (with a linearly increasing offset) in relation to a local connection direction toward the sample position. Regions without detection remain, however, as a result of the absorption of X-ray quanta in the respective front sensor.

Further X-ray detectors comprising semiconductor-based detector modules have been disclosed by the HyPix-Arc 150° from Rigaku, cf. https://www.rigaku.com/en/arc, downloaded on Feb. 8, 2019, or the X-ray diffractometer from Stresstech, cf. e.g. company publication "Xstress 3000 G3/G3R", Stresstech GmbH, Rennerod, D E, undated, downloaded on Feb. 8, 2019, or the SmartSite RS portable stress analyzer from Rigaku, cf.

https://www.rigaku.com/en/products/xrd/smartsite-rs, downloaded on Feb. 8, 2019, or else by US 2017/0097309 A1.

In the past, X-ray diffraction images have also been produced on photographic paper (film), including curved photographic paper, cf. FIG. 2.3.4.1 of "International Tables for Crystallography".

OBJECT OF THE INVENTION

It is an object of the invention to provide a measurement arrangement which makes it possible to acquire gapless one-dimensional measurement information about a measurement sample in a simple and rapid manner.

DESCRIPTION OF THE INVENTION

This object is achieved according to the invention by means of a measurement arrangement of the type mentioned in the introduction which is characterized in that at least one portion of the detector modules that are successive in relation to the measurement direction forms overlap regions in which in each case at least two detector modules overlap in the measurement direction and are arranged next to one another in the transverse direction, wherein the active zones of the detector modules in the overlap regions are directly adjacent to one another in the measurement direction or overlap in the measurement direction, such that the totality of the active zones of the detector modules enables the X-ray radiation emanating from the sample position to be measured without gaps in the measurement direction.

The measurement arrangement according to the invention serves for simple and gapless determination of 1D measurement data or measurement information about a measurement sample. The detector modules or the active zones thereof can make available in each case measurement data resolved in the measurement direction (intensity as a function of the position in the measurement direction). By way of the totality of the detector modules, the overlap regions set up make it possible to provide a gapless total measurement data set (intensity as a function of the position in the measurement direction) across the detector modules that are successive in the measurement direction. In particular, the unavoidable dead zones of the individual detector modules (in particular at the ends, relative to the measurement direction) do not produce any gaps in the total data set. Typically, all the detector modules of the X-ray detector according to the invention form overlap regions with respect to all their closest adjacent detector modules in the measurement direction.

What is achieved by means of the overlap regions according to the invention is that the dead zone of a detector module, in so far as it is not overlapped by at least one active zone of this detector module itself in the measurement direction, is overlapped by an active zone of at least one further detector module in the measurement direction. This further detector module is arranged at least partly next to the detector module in the transverse direction, which is structurally simple and avoids mutual shading of the detector module and the further detector module or at least of the active zones thereof in relation to the connection direction with respect to the sample position. The detector module and the further detector module are accordingly typically arranged at identical positions in the connection direction and do not lie one above another in relation to the connection direction, and in particular the detector module does not lie above an active zone of the further detector module in relation to the connection direction, and vice versa.

In the case of a typical powder diffractometry measurement, the same diffraction information about the sample is contained everywhere along a Debye ring, such that at the location of a dead zone of the detector module a sidestepping along the Debye ring, and thus substantially transversely with respect to the measurement direction and transversely with respect to the connection direction with respect to the sample, to an active zone of the further detector module does not adversely affect the measurement result. On the contrary, the one-dimensional diffraction information can rather be completed by means of this procedure. Even if the Debye ring has a shape deviating from the circular shape, for instance an elliptic shape caused by mechanical stresses, nevertheless at least locally the radius and possibly the width (sharpness) of the Debye ring would be virtually constant, particularly if the sidestepping by means of the further detector module results in a change in the circumferential angle at the Debye ring of 10° or less, preferably 5° or less.

The measurement arrangement can be used in particular with the X-ray detector stationary (and also with a stationary X-ray source or stationary X-ray beam that illuminates the sample position) or merely with movement components transversely with respect to the measurement direction (that is to say only one axis of rotation), which enables a compact construction and rapid measurements.

According to the invention, the X-ray detector has a large aspect ratio of the totality of the active zones of all the detector modules; usually it even holds true that AM≥8*AQ or AM≥10*AQ. In the case of typical designs according to the invention, it furthermore holds true that AM≥200 mm and AQ≤40 mm. With these designs, one-dimensional measurement information can be attained conveniently and with a compact and cost-effective construction.

Typically, the entire measurement arrangement or the X-ray detector has a large number of detector modules that are successive in the measurement direction, for example at least 10 or at least 20. By contrast, in the transverse direction generally only a small number of detector modules lie next to one another, for example only a maximum of 3 or a maximum of 2, or the detector modules are even arranged only in one row running in the measurement direction.

It should be noted that the transverse direction typically runs approximately and preferably exactly perpendicular to the (local) connection direction with respect to the sample position and to the (local) measurement direction; however, small deviations (for instance up to 10° or up to approximately 5°) are usually unproblematic (for instance with regard to the spatial resolution of the measurement information). The measurement direction likewise typically runs approximately perpendicular and preferably exactly perpendicular to the (local) connection direction with respect to the sample position; however, once again small deviations (for instance up to 10° or up to approximately 5°) are usually unproblematic (for instance with regard to parallax effects), and even larger deviations can occur particularly with the measurement direction running straight.

The measurement arrangement according to the invention or the X-ray detector substantially constitutes a 1D detector for X-ray radiation. In the simplest case, the measurement arrangement—apart from a possible juxtaposition of detector modules in relation to the transverse direction for passing over dead zones—has no spatial resolution in the transverse direction. Insofar as the active zones of the individual detector modules have a spatial resolution in the transverse direction as well, then this is generally not used for characterizing the measurement sample.

PREFERRED EMBODIMENTS

One preferred embodiment of the measurement arrangement according to the invention provides that the detector modules comprise first detector modules and second detector modules, wherein the first detector modules are arranged one behind another in a first row in the measurement direction, and the second detector modules are arranged one behind another in at least one second row in the measurement direction, that the first row and the at least one second row are arranged next to one another in relation to the transverse direction, and that the first detector modules, relative to the second detector modules, are arranged offset relative to one another in the measurement direction, such that the active zones of the second detector modules overlap dead zones of the first detector modules, which in the measurement direction are not overlapped by active zones of the first detector modules, in the measurement direction. The arrangement of the first and second detector modules in a first and at least one second row is structurally particularly simple. It should be noted that the rows can run along (parallel) straight lines or else along (parallel) circular arcs. Typically, the first and second detector modules do not overlap in the transverse direction.

A development of this embodiment is particularly preferred in which for a first length L1 in the measurement direction, over which the active zone or active zones of a first detector module extend(s), and for a second length L2 in the measurement direction, which lies between the active zones of second detector modules which are successive in the at least one second row in the measurement direction and which both form an overlap region with the first detector module, the following holds true in each case:

L2≥0.2*L1, preferably L2≥0.4*L1. With further particular preference it also holds true that L2≥0.6*L1 or L2≥0.8*L1, or else L1=L2. In regions covered by the active zone or active zones of the first detector module in the measurement direction, no overlap with the active zones of the second detector modules is necessary in principle. Accordingly, active-zone-free regions can remain in the second row, which keeps the structural complexity and thus the production costs of the measurement arrangement low.

A development is likewise preferred which provides that the first row and the at least one second row comprise at least one spacing-exhibiting row in which the detector modules that are successive in the measurement direction are arranged in a manner spaced apart from one another with a spacing AB in relation to the measurement direction, in particular wherein it holds true that AB≥0.3*LM, where LM: length of the detector modules in the spacing-exhibiting row in the measurement direction. Preferably, it also holds true that AB≥0.5*LM. In regions covered by the active zone or active zones of the first detector module in the measurement direction, no overlap with the active zones of the second detector modules is necessary in principle. Accordingly, regions in the second row can remain empty (without a detector module), which once again keeps the structural complexity and thus the production costs of the measurement arrangement low.

In one preferred embodiment, the detector modules are arranged one behind another in only one row in the measurement direction, wherein in the overlap regions the detector modules also overlap in the transverse direction. As a result, a construction that is particularly narrow (compact in the transverse direction) is possible, and so locationally accurate measurements with little stray radiation can be carried out.

Preferably, one embodiment provides that the detector modules are embodied as approximately wedge-shaped and/or interlocked in the overlap regions. As a result, an overlap or abutment of the active zones in the overlap region can be set up in a simple manner, in particular also within only one row of detector modules. By means of detector modules embodied in a wedge-shaped fashion, particularly simple mutual positioning (or adjustment) can also be effected.

An embodiment is also preferred in which in the overlap regions the active zones of the overlapping detector modules overlap in double measurement regions in the measurement direction. By setting up double measurement regions, it is possible to allow a larger mounting tolerance, without having to fear that a gap will arise in the measurement direction. Moreover, in the double measurement regions it is generally possible to attain a higher count rate for improving the statistical relevance of the measurement data; however, a calibration then has to be effected in order to make the intensities in double measurement regions and between double measurement regions comparable.

In a preferred development of this embodiment, the active zones of the detector modules are embodied in a shortened fashion in relation to the transverse direction in the double measurement regions in comparison with outside the double measurement regions. As a result, it is possible to carry out a setting of the effective, total sensor length in the transverse direction at a respective position along the measurement direction, in particular an effective, total sensor length that is the same everywhere in order to avoid a calibration.

Another, advantageous embodiment provides that in the overlap regions the active zones of the overlapping detector modules do not overlap in the measurement direction. In this case, in the measurement direction only the dead zone of one detector module overlaps the active zone of another detector module; however, the active zones of the detector modules are then directly adjacent to one another. It is not necessary to add up the count rates of different detector modules with respect to a specific position along the measurement direction in order to determine the intensity for this position, which makes the evaluation of the sensor data particularly simple.

An embodiment is also preferred in which the at least one active zone of a respective detector module has a plurality of sensor strips which are successive in the measurement direction and which extend at least substantially in the transverse direction. The sensor strips enable a spatial resolution in the measurement direction; each of the strips sets up a (measurement) position in the (or along the) measurement direction. A sensor strip most simply forms a uniform sensor region that is measured as a whole (that is to say only one sensor element). Alternatively, the sensor strip can also be constructed from a plurality of measurement pixels (a plurality of sensor elements) arranged one behind another in the transverse direction. The sensor strips are typically embodied as approximately rectangular. Successive sensor strips are typically directly adjacent to one another in the measurement direction, such that they form a closed active zone. The sensor strips of a detector module are typically arranged parallel to one another. Detector modules having sensor strips are typically set up as semiconductor modules. It should be noted that as an alternative to sensor strips a detector module can also set up a spatial resolution in the measurement direction in a different way, for instance by means of propagation time differences of charge pulses (such as in a gas-detector-based detector module).

A development of this embodiment is preferred wherein at all positions along the measurement direction a cumulative effective strip length in the transverse direction of the sensor strips of all the detector modules which form a sensor strip at the respective position is identical. As a result, it is possible to determine an intensity distribution along the measurement direction by simple addition of the count rates of the sensor strips at a respective position along the measurement direction; a calibration between different positions is not required.

A development is also preferred in which at least one portion of the sensor strips, preferably each sensor strip, has at least one sensor element having a sensor element aspect ratio SEAV≥3, wherein SEAV=SEB/SEH and SEB: width of the sensor element in the transverse direction, and SEH: height of the sensor element in the measurement direction. With the sensor elements extended in the transverse direction in such a way, the count rate can be increased and the statistical quality of the measurement data can be improved. At least locally, the diffraction information of a typical measurement sample does not change along the transverse direction, and so no sample information is lost as a result of this integration.

A development is also preferred in which the sensor strips are embodied as approximately rectangular, wherein the longitudinal sides of the sensor strips extend in the transverse direction, and wherein the longitudinal sides of sensor strips of a respective active zone that are successive in the measurement direction lie against one another. Corresponding detector modules are simple to produce and simple to mount, in particular to adjust.

In one advantageous embodiment, the measurement direction runs straight. This is particularly simple and flexible in terms of construction (in particular, the distance between sample position and X-ray detector can easily be changed as necessary), but for more extensive measurement regions or short distances with respect to the sample position can lead to measurement errors, in particular so-called parallax effects.

In an alternative, particularly preferred embodiment, the measurement direction runs in a curved fashion, in particular wherein the measurement direction runs as a circular arc, at the center point of which the sample position is arranged. As a result, it is possible to carry out particularly accurate diffraction measurements, with only small measurement errors as a result of parallax effects. The measurement direction can be led here (approximately) perpendicular to the local connection direction with respect to the sample; it should be noted that in practice the overall curved course of the measurement direction is usually approximated locally in sections by a straight course (straight substrates of the individual detector modules) and bends (at substrate transitions).

In one preferred development of this embodiment, the detector modules are each arranged on a planar substrate lying perpendicular to the local connection direction with respect to the sample position. This combines an easily practicable, cost-effective construction of the detector modules with small measurement errors.

An embodiment is preferred in which the detector modules are embodied as semiconductor detector modules. Semiconductor detector modules are comparatively cost-effective, can offer a high spatial resolution (e.g. 50 μm or better) and (in comparison with gas detectors) are also suitable for greater total count rates and need little maintenance. Alternatively, detector modules based on gas detectors can also be used, for example; these can simulate a curved course of the measurement direction very exactly.

In one preferred embodiment, a mask is arranged in front of the detector modules, which mask shades at least partial areas of at least one portion of the active zones of the detector modules with regard to the sample position and thereby reduces a usable width of the totality of the active zones in the transverse direction compared with a full width of the totality of the active zones without shading. The mask makes it possible to limit the detection width in the transverse direction in order to achieve a high spatial resolution for a scan in the transverse direction. The signal-to-background ratio can moreover be significantly improved since the active area (used active zone) can be concentrated by the mask on that X-ray radiation with the greatest proportion of useful signal. If the active zones are configured not only for spatially resolved detection in the measurement direction but also for spatially resolved detection in the transverse direction, undesired parts of the active zones can also be ignored during the measurement or evaluation ("virtual mask").

The scope of the present invention also includes the use of an above-described measurement arrangement according to the invention for measuring a measurement sample, wherein the measurement sample is irradiated by an X-ray beam and is arranged at the sample position or is imaged onto the sample position by an X-ray optical unit, and wherein measurement data of the detector modules which were measured simultaneously are combined to form a one-dimensional total measurement data set having no gaps in relation to the positions along the measurement direction, wherein at positions along the measurement direction in which, in an overlap region of at least two detector modules, there lies only a dead zone of at least one of the overlapping detector modules, measurement data of at least one other detector module of the overlapping detector modules which has an active zone at this position are used in order to determine the continuous total measurement data set. By means of this procedure, a one-dimensional measurement (in particular X-ray diffraction measurement) of a measurement sample can be effected in a simple and rapid manner with little outlay in terms of apparatus. All diffraction rings covered by the totality of the detector modules are recorded simultaneously in a single, short exposure interval. The irradiation of the measurement sample and the arrangement of the X-ray detector are typically effected in such a way that in the transverse direction the X-ray radiation arriving at the X-ray detector (at least across AQ) contains redundant information, for example on account of the width of the X-ray beam exciting the measurement sample.

Further advantages of the invention are evident from the description and the drawing. Likewise, according to the invention, the features mentioned above and those that will be explained further below can each be used individually by themselves or as a plurality in any desired combinations. The embodiments shown and described should not be understood as an exhaustive enumeration, but rather are of exemplary character for outlining the invention.

DETAILED DESCRIPTION OF THE INVENTION AND DRAWING

Figure 4:
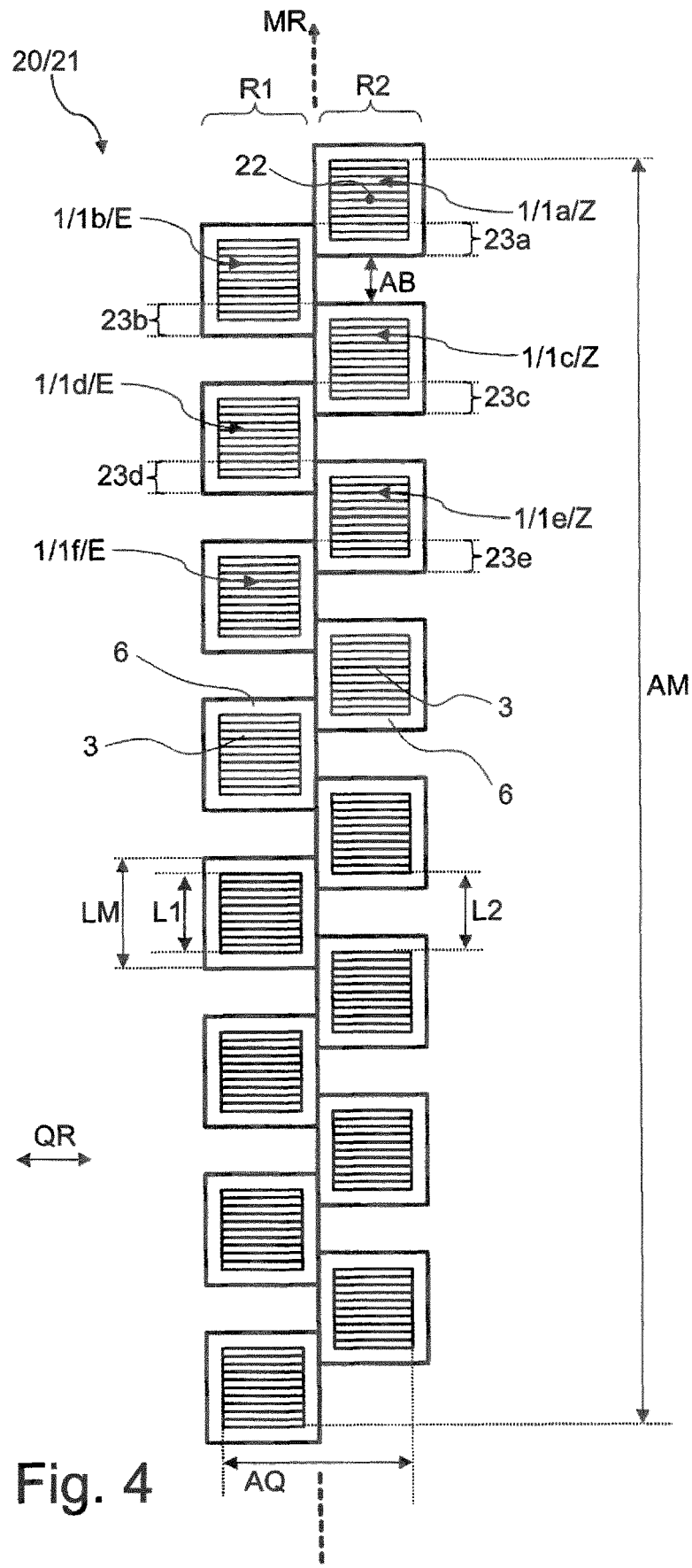
FIG. 4 shows a schematic plan view of a measurement arrangement according to the invention, in accordance with a first embodiment, having two rows of detector modules.
Figure 9:
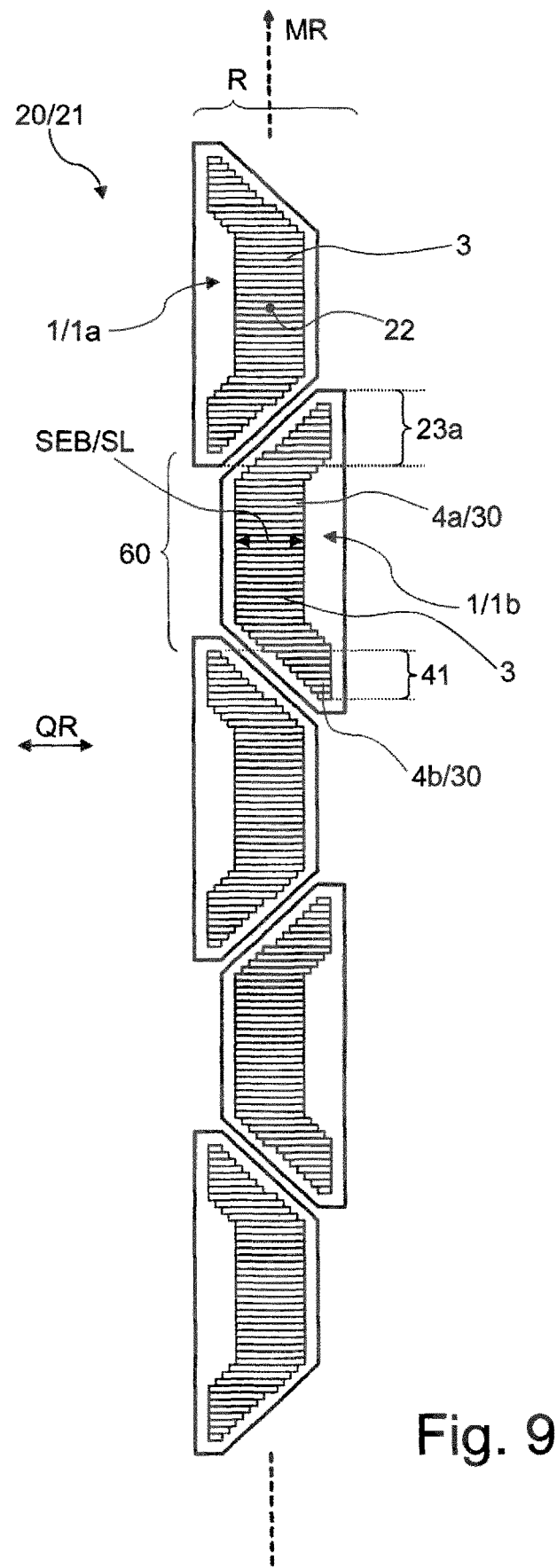
FIG. 9 shows a schematic plan view of a measurement arrangement according to the invention, in accordance with a sixth embodiment, having one row of wedge-shaped detector modules arranged in an alternating fashion, each having one active zone.
Figure 11:
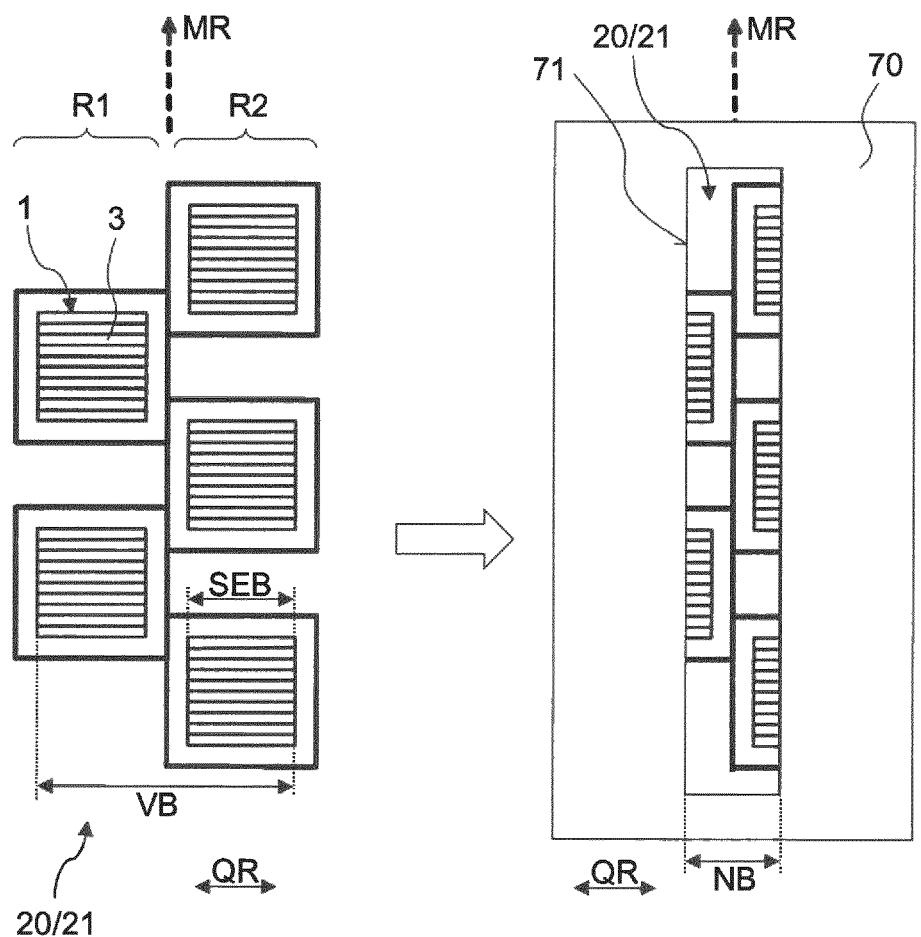
Figure 12:
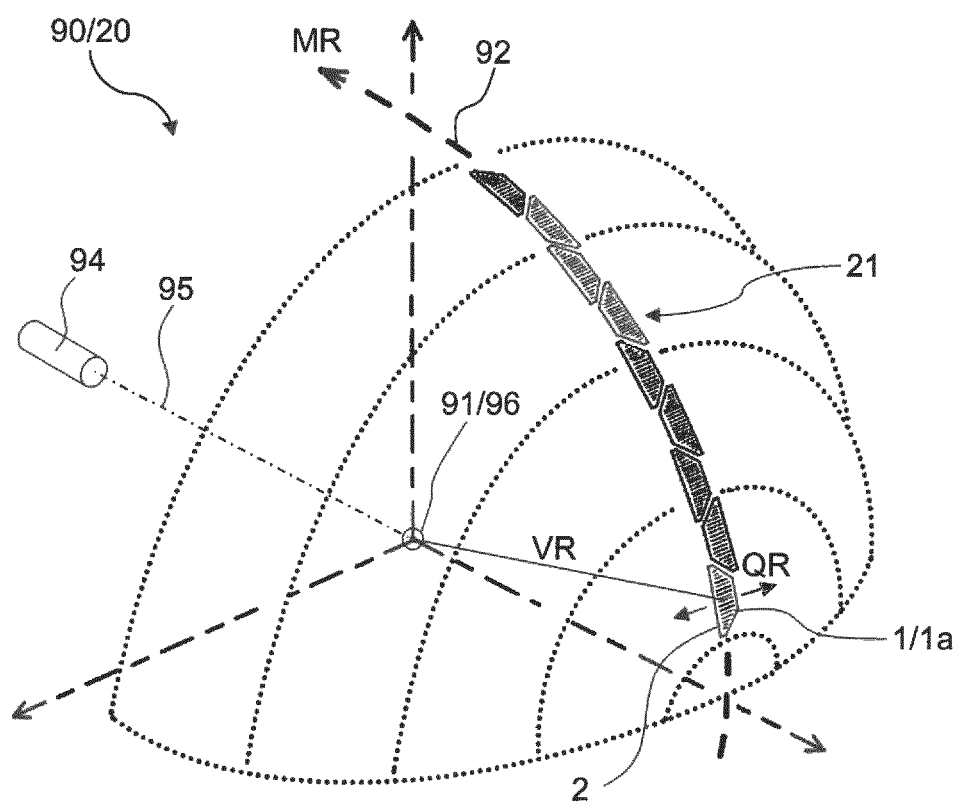
Figure 13:
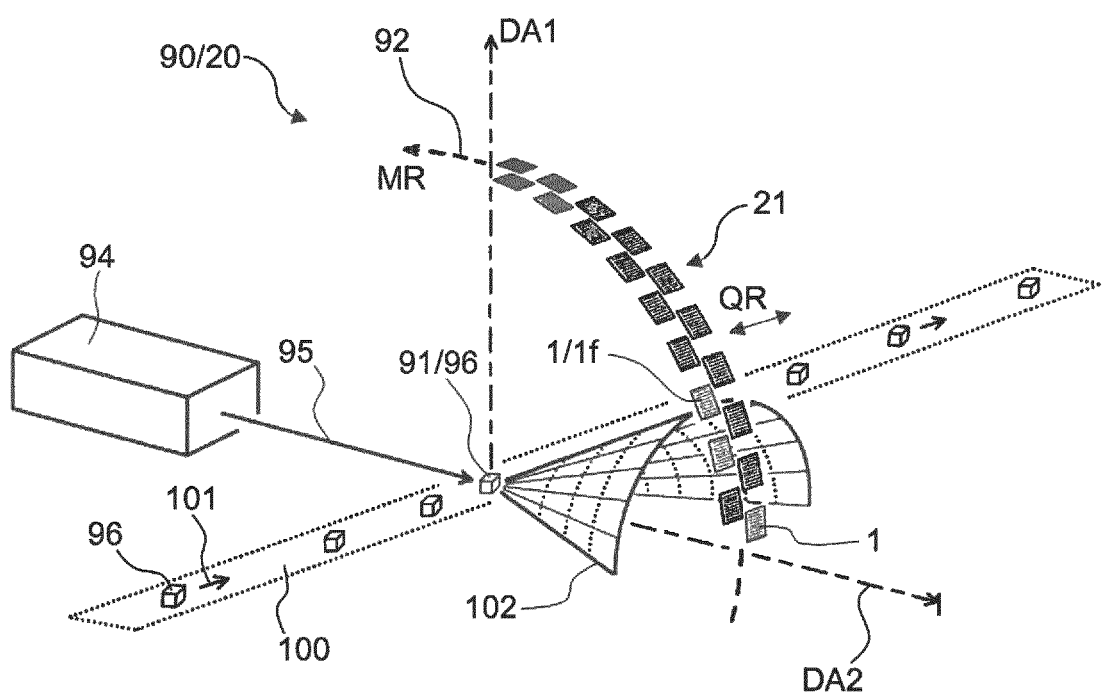
Figure 14:
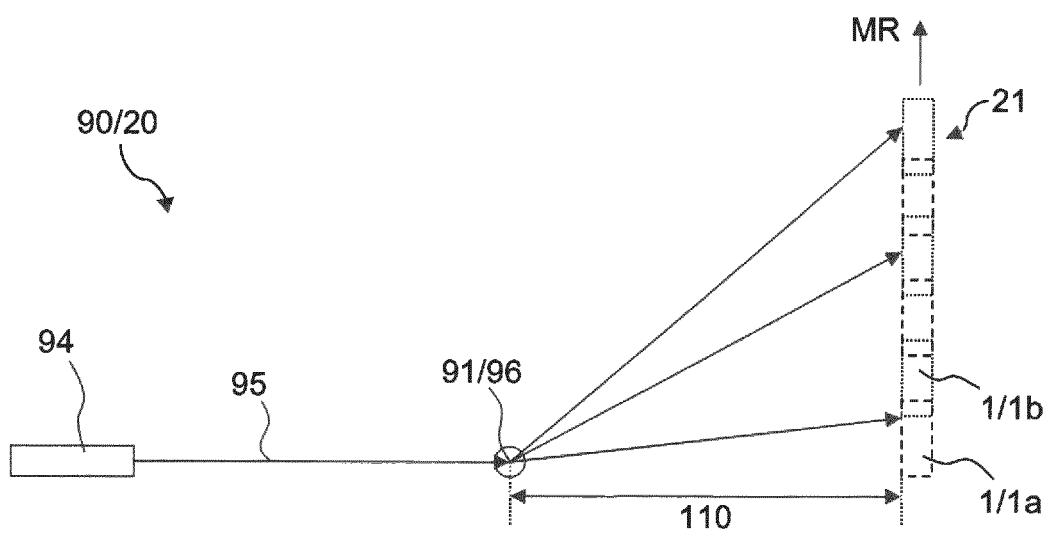

FIG. 11 schematically shows a partial extract from the measurement arrangement in accordance with FIG. 4, in a schematic plan view, with arrangement of a mask;

FIG. 12 schematically shows a first measurement set-up, comprising a measurement arrangement according to the invention similar to FIG. 9, with the measurement direction running in the shape of a circular arc, the detector modules being arranged along said measurement direction;

FIG. 13 schematically shows a second measurement set-up, comprising a measurement arrangement according to the invention similar to FIG. 4, with the measurement direction running in the shape of a circular arc, the detector modules being arranged along said measurement direction, and with a conveying device for measurement samples;

FIG. 14 schematically shows a third measurement set-up, comprising a measurement arrangement according to the invention similar to FIG. 4, with the measurement direction running straight, the detector modules being arranged along said measurement direction.

Figure 1:
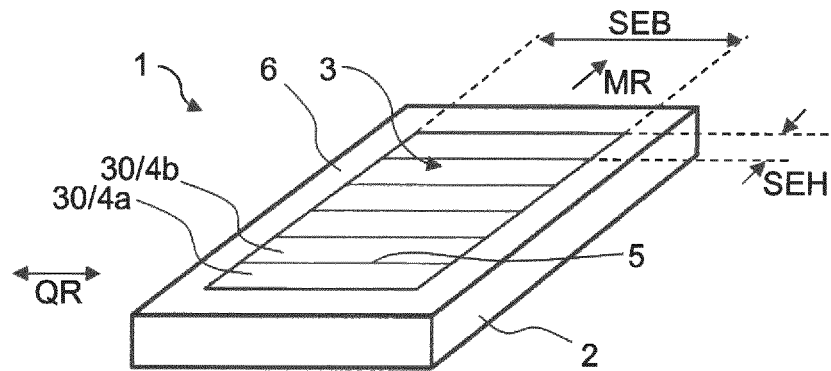
FIG. 1 shows, in a schematic oblique view, a detector module for a measurement arrangement according to the invention, embodied as a semiconductor detector module having sensor strips.

FIG. 1 shows a detector module 1 for a measurement arrangement according to the invention in a schematic oblique view.

The detector module 1 is embodied here as a semiconductor detector module having a planar (flat) substrate 2. It has an active zone 3, embodied here with a plurality of sensor strips; by way of example here two sensor strips 4a, 4b have been marked with reference signs and a total of six sensor strips have been illustrated; in practice, a detector module 1 usually has significantly more sensor strips, for example at least 64 sensor strips or even at least 96 sensor strips (not illustrated in more specific detail). The sensor strips 4a, 4b are embodied as rectangular here, and their long sides 5 lie against one another. In this case, the sensor strips 4a, 4b are lined up along an (envisaged) measurement direction MR and each extend along a transverse direction QR, and here each have only one continuous sensor element 30. In the exemplary embodiment shown, the width SEB of the sensor elements 30 in the transverse direction QR is approximately 5 times the magnitude of the height SEH of the sensor elements 30 in the measurement direction MR, such that the sensor element aspect ratio $SEAV=SEB/SEH=5$.

X-ray quanta (photons having an energy of between 1 keV and 250 keV) can be detected within the active zone 3, wherein the sensor strip 4a, 4b, in which the X-ray quantum is detected indicates the location of the registration along the measurement direction MR. Accordingly, a spatial resolution in relation to the measurement direction MR is effected by way of the sensor strips 4a, 4b. In the exemplary embodiment shown, a respective sensor strip 4a, 4b is embodied in only one continuous sensor element 30 in the transverse direction QR, and so here it is not possible to acquire a spatial resolution in the transverse direction QR within the sensor strips 4*a*, 4*b*.

The active zone 3 is surrounded by a so-called dead zone 6, wherein the dead zone 6 here forms a rectangular frame around the active zone 3. X-ray quanta which impinge on the detector module 1 in the dead zone 6 are not registered. Dead zones 6 are unavoidable in detector modules 1 in principle for design reasons.

Figure 2:
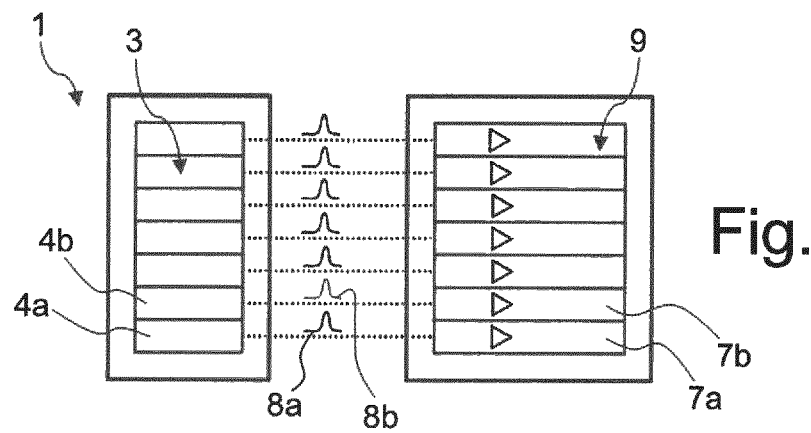
FIG. 2 shows the detector module from FIG. 1 in a schematic plan view, including a schematic illustration of the associated measurement channels.

FIG. 2 illustrates the electrical interconnection of a detector module 1 similar to that shown in FIG. 1 once again in more specific detail. Each sensor strip 4*a*, 4*b* of the active zone 3 of the detector module 1 is assigned a measurement channel 7*a*, 7*b* of evaluation electronics 9. An X-ray quantum impinging on a specific sensor strip 4*a*, 4*b* generates a charge pulse 8*a*, 8*b*, which is registered in the associated measurement channel 7*a*, 7*b*. In FIG. 2, a charge pulse 8*a*, 8*b* is illustrated here for each sensor strip 4*a*, 4*b*; it should be noted that each X-ray quantum generally triggers only one charge pulse 8*a*, 8*b*, which is registered in only one of the measurement channels 7*a*, 7*b*.

Figure 3:
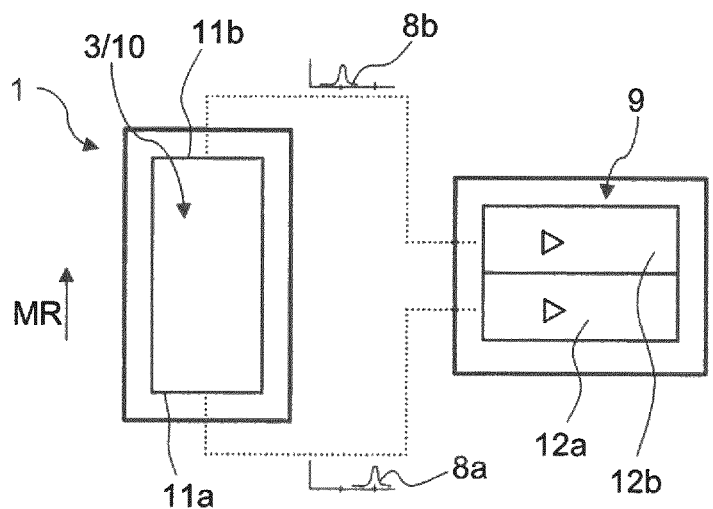
FIG. 3 shows a further detector module for a measurement arrangement according to the invention in a schematic plan view, embodied as a gas detector module, including a schematic illustration of the associated measurement channels.

FIG. 3 shows an alternative design of a detector module 1 for a measurement arrangement according to the invention. The detector module 1 here is embodied with a gas detector. The active zone 3 of the detector module 1 here is formed by a window 10 of a gas space. An X-ray quantum penetrating into the active zone 3 triggers local ionization of the gas in the gas space, and the positive and negative charges generated drift to a first (here bottom) electrode 11*a* and to a second (here top) electrode 11*b* at the edge of the gas space. The electrodes 11*a*, 11*b* are respectively connected to a measurement channel 12*a*, 12*b* of evaluation electronics 9. The impingement time of the respective charge pulse 8*a*, 8*b* is measured at the measurement channel 12*a*, 12*b*. The location of the impingement of the X-ray quantum in the gas space or in the active zone 3 in relation to the measurement direction MR can be deduced from a difference between the impingement times of the charge pulses 8*a*, 8*b*.

FIG. 4 shows a first embodiment of a measurement arrangement 20 according to the invention for X-ray radiation. The measurement arrangement 20 has a plurality of detector modules 1, which are embodied here, in a manner similar to that as illustrated in FIG. 1, as semiconductor detector modules having continuous sensor strips for a spatial resolution along the sequential direction of the sensor strips. The detector modules 1 form the essential components of an X-ray detector 21 of the measurement arrangement 20. The detector modules 1 are configured to detect X-ray radiation emanating from a sample position; for simplification, the sample position is not illustrated in more specific detail here (but cf. therewith FIGS. 12-14 in this respect).

All the detector modules 1 here are arranged successively individually in relation to an (envisaged) measurement direction MR, that is to say that each detector module 1 is arranged at a different location in relation to the measurement direction MR (the location of a detector module 1 can be defined for example in each case by way of the center 22 of the detector module 1). From top to bottom in FIG. 4 the detector modules 1 are lined up in the sequence 1*a*, 1*b*, 1*c*, 1*d*, 1*e*, 1*f* etc. in relation to the measurement direction MR.

All the detector modules 1 here are embodied structurally identically, in each case with an active zone 3 having a length L1 in the measurement direction MR, and with a dead zone 6 surrounding the active zone 3 in a frame-like manner. The detector modules 1 each have a length LM in the measurement direction MR.

The active zones 3 each contain sensor strips of identical width, which each contain only one continuous sensor element and are oriented transversely with respect to the measurement direction MR.

In the embodiment shown, the detector modules 1, 1*a*-1*f* in this case form a first row R1 and a second row R2. Within the first row R1 the detector modules 1*b*, 1*d*, 1*f* etc. ("first detector modules" E) are arranged one behind another in the measurement direction MR and at an identical position in each case in relation to the transverse direction QR. Within the second row R2 the detector modules 1*a*, 1*c*, 1*e* etc. ("second detector modules" Z) are arranged one behind another in the measurement direction MR and at an identical position in each case in relation to the transverse direction QR. The two rows R1, R2 lie next to one another in relation to the transverse direction QR.

In the embodiment shown, successive detector modules, for instance the detector modules 1*a*, 1*b*, in each case overlap in overlap regions, for instance the overlap region 23*a*, in relation to the measurement direction MR. In other words, in the overlap region 23*a* both a portion of the detector module 1*a* and a portion of the detector module 1*b* are found at all positions in relation to the measurement direction MR. Further overlap regions 23*b*, 23*c*, 23*d* and 23*e* are formed by the detector module pairs 1*b*/1*c*, 1*c*/1*d*, 1*d*/1*e* and 1*e*/1*f*. In the embodiment shown, in this case the active zones 3 of the detector modules 1 of a respective overlap region 23*a*-23*e* do not overlap in relation to the measurement direction MR, rather the active zones 3 are directly adjacent to one another in relation to the measurement direction MR (even if the active zones 3 adjacent to one another are arranged at different positions in the transverse direction QR, corresponding to the different positions of the rows R1, R2 in the transverse direction QR).

The detector modules—for instance the detector modules 1*a*, and 1*b*—which overlap in an overlap region, for instance the overlap region 23*a*, in the measurement direction MR do not overlap in the transverse direction, that is to say that at every position along the transverse direction only the detector module 1*a* or the detector module 1*b* may be found, but not both.

In the embodiment shown, both rows R1, R2 are embodied as spacing-exhibiting rows in which the detector modules that are successive in the measurement direction MR, for instance the detector modules 1*a*, 1*c* in the second row R2, have a spacing AB in relation to the measurement direction MR. For the spacing AB it holds true here that approximately AB=0.42*LM.

The active zones 3 of the detector modules 1 that are successive in a respective row R1, R2 each have a spacing L2 in the measurement direction MR. In the present case, for the spacing L2 it holds true here that L2=L1, since the active zones 3 are adjacent to one another in the overlap regions 23*a*-23*e* in the measurement direction MR.

The totality of the active zones 3 of all the detector modules 1 of the X-ray detector 21 has an extent AM in the measurement direction MR, and an extent AQ in the transverse direction. Approximately AM=6.7*AQ holds true in the embodiment shown. With this aspect ratio the measurement arrangement 20 is well suited to a one-dimensional X-ray measurement, for instance powder diffractometry of a measurement sample.

During an X-ray measurement, X-ray radiation emanating from a measurement sample at the sample position (not illustrated) impinges on the X-ray detector 21. In this case, X-ray radiation containing the same information from the measurement sample typically illuminates the entire extent AQ of the X-ray detector uniformly. It is therefore unimportant whether measurement information (or an X-ray intensity) concerning a specific (measurement) position along the measurement direction MR is measured by a detector module 1b, 1d, 1f etc. of the first row R1 or by a detector module 1a, 1c, 1e of the second row R2. By means of the sequence of the detector modules 1 along the measurement direction MR with active zones 3 directly adjacent to one another, it is possible to obtain gapless measurement information in the measurement direction over the entire extent AM of the X-ray detector 21. At positions in the measurement direction MR at which in the first row R1 there lies a dead zone 6 of a detector module 1b, 1d, 1f or a gap between the detector modules 1b, 1d, 1f, the measurement information can be obtained by means of an active zone 3 of a detector module 1a, 1c, 1e of the second row R2, and vice versa.

Figure 5:
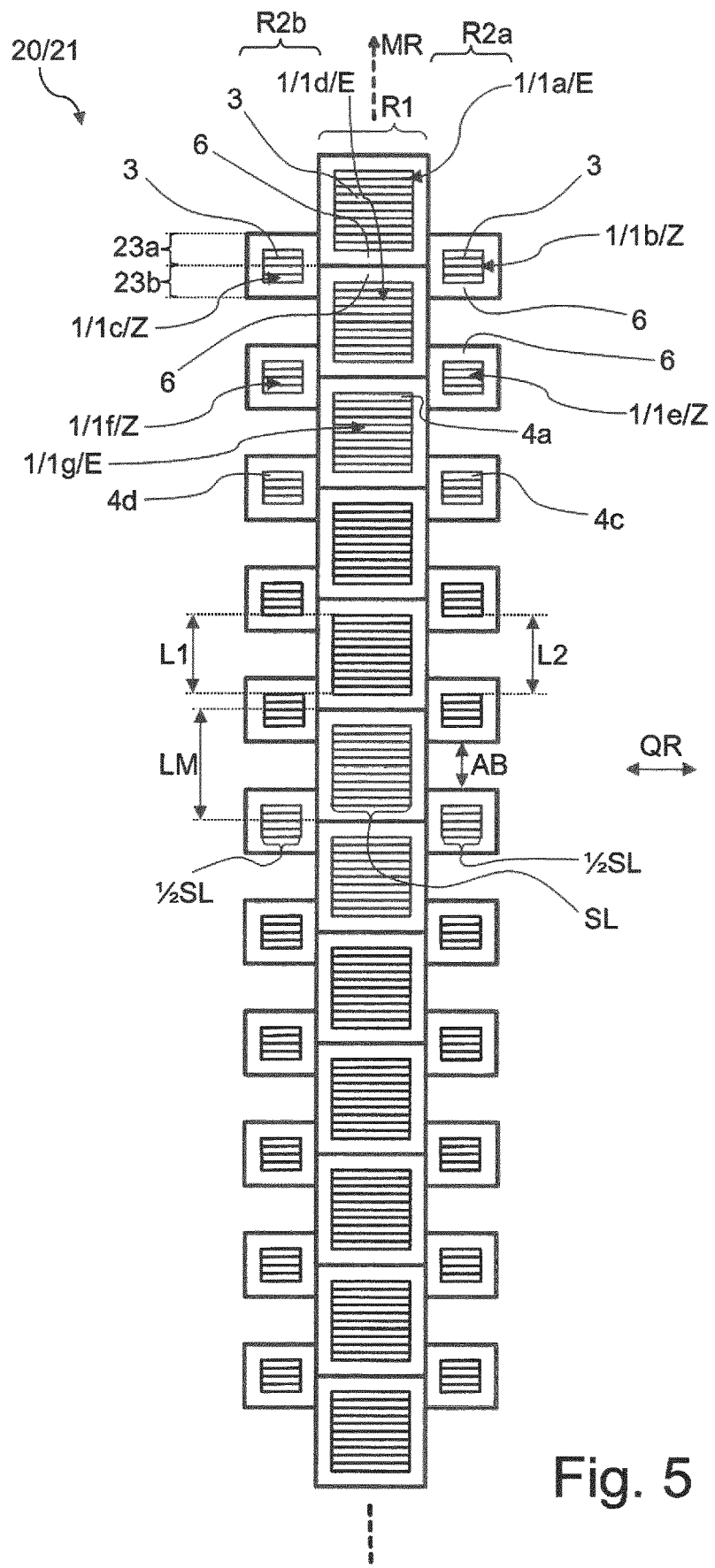
FIG. 5 shows a schematic plan view of a measurement arrangement according to the invention, in accordance with a second embodiment, having three rows of detector modules.

FIG. 5 shows a second embodiment of a measurement arrangement 20 according to the invention; only the essential differences with respect to the embodiment from FIG. 4 will be explained.

In the embodiment shown in FIG. 5, the detector modules 1 are arranged in three rows, namely a central, first row R1 (having detector modules 1a, 1d, 1g, etc., "first detector modules" E), and two second rows R2a, R2b (having detector modules 1b, 1e and 1c, 1f, "second detector modules" Z). The detector modules 1 here are arranged successively in relation to the measurement direction MR in an alternating sequence of single detector modules 1 of the first row R1 and groups of two detector modules 1 from the second rows R2a, R2b. From top to bottom in FIG. 5 the detector modules 1 are lined up in relation to the measurement direction MR in the sequence single detector module 1a, group of detector modules 1b, 1c, single detector module 1d, group of detector modules 1e, 1f, single detector module 1g, etc. The detector modules 1a, 1d, 1g of the first row ("first detector modules" E) here are embodied as larger than the detector modules 1b, 1c, 1e, 1f of the second rows R2a, R2b ("second detector modules" Z).

The first row R1 here is not embodied as a spacing-exhibiting row, since the detector modules 1a, 1d, 1g of the first row R1 here directly adjoin one another. By contrast, the second rows R2a, R2b are spacing-exhibiting rows, with a spacing L2 between successive active zones 3 of the detector modules 1b, 1e in the measurement direction MR, and a spacing AB between the successive detector modules 1b, 1e in the measurement direction MR.

Since the active zones 3 of the detector modules 1a, 1d, 1g of the first row R1 and the active zones 3 of the groups of detector modules 1b/1c and 1e/1f in the second rows R2a, R2b are directly adjacent to one another in the measurement direction MR (albeit with a position offset in the transverse direction QR), it once again holds true that L2=L1, where L1: length of the active zones 3 of the detector modules 1a, 1d, 1g of the first row R1. In addition, it holds true here that approximately AB=0.41*LM, where LM: length of the detector modules 1a, 1d, 1g of the first row R1 in the measurement direction MR.

In this embodiment, the active zones 3 of the groups of detector modules 1b/1c and 1e/1f of the second rows R2a, R2b bridge the dead zones 6 of the detector modules 1a, 1d, 1g that are respectively successive in the first row R1. Conversely, the active zones 3 of the detector modules 1a, 1d, 1g of the first row R1 bridge the dead zone 6 of the detector modules 1b, 1e and 1c, 1f and the gaps between the detector modules 1b, 1e and 1c, 1f of the second rows R2a, R2b in the measurement direction MR. Accordingly, for example at the group 1b/1c of detector modules of the second rows R2a, R2b the overlap regions 23a (with respect to the detector module 1a of the row R1) and 23b (with respect to the detector module 1d of the row R1) are formed, in which the detector modules 1b/1c overlap the detector module 1a (overlap region 23a) and the detector modules 1b/1c overlap the detector module 1d (in the overlap region 23b) in the measurement direction MR; however, there is once again no overlap of the detector modules (for instance 1a, 1b, 1c) of an overlap region (for instance 23a) in the transverse direction QR.

The sensor strips 4c, 4d of the detector modules 1b, 1e, 1c, 1f in the second rows R2a, R2b have a width (in the transverse direction QR), which is in each case half the magnitude of the width of the sensor strips 4a of the detector modules 1a, 1d in the first row. Since, in the bridging groups 1b, 1c and 1e, 1f of detector modules in the second rows R2a, R2b, in each case two sensor strips 4c, 4d simultaneously read out the same position along the measurement direction MR, but in each case only one sensor strip 4a reads out the position in the detector modules 1a, 1d, 1g of the first row R1, both cases each yield the same effective, total sensor length SL and thus integration area for X-ray radiation. Accordingly, for determining the intensity of X-rays as a function of time, it is necessary to use only direct count rates (from row R1) and cumulative count rates (from the rows R2a, R2b) for each position along the measurement direction MR, and in particular there is no need to perform a calibration.

Figure 6:
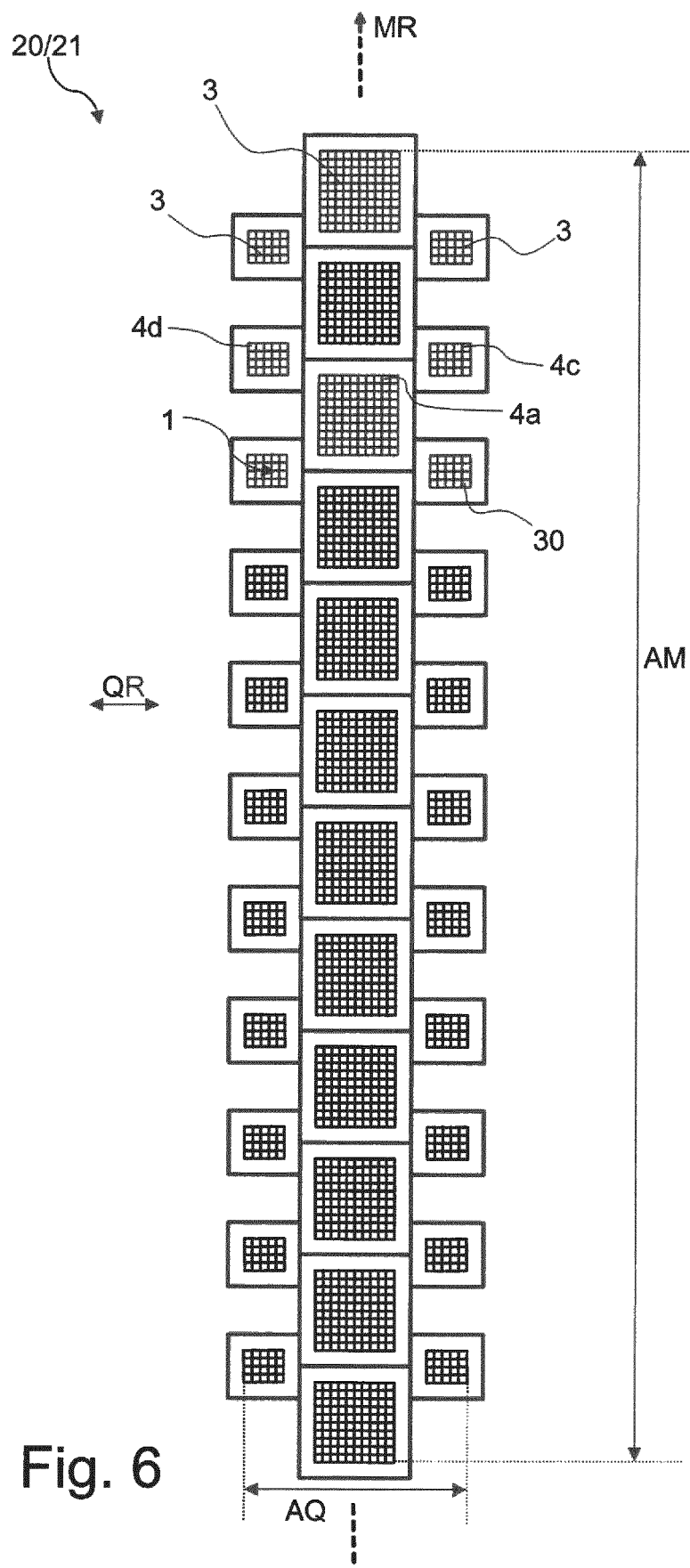
FIG. 6 shows a schematic plan view of a measurement arrangement according to the invention, in accordance with a third embodiment, having three rows of detector modules, with active zones that are spatially resolved in the transverse direction.

FIG. 6 shows a third embodiment of a measurement arrangement 20 similar to the measurement arrangement shown in FIG. 5. Once again only the essential differences will be explained.

In this embodiment, the sensor strips 4a, 4c, 4d of the detector modules 1 (which each extend in the transverse direction QR) are each subdivided into pixel-shaped sensor elements 30 again in the transverse direction QR. As a result, a spatially resolved intensity determination of X-ray radiation can be effected not only along the measurement direction MR but also along the transverse direction QR. However, the region that is spatially resolved in the transverse direction QR is relatively small, cf. the extents AM and AQ, where here approximately AM=5.8*AQ. The subdivision in the transverse direction QR is typically used to reduce ("virtual mask") an effective width of the totality of the active zones 3 in the transverse direction QR within which detected X-ray radiation is evaluated, in order to reduce the influence of stray radiation or else in order to be able to carry out a scan of the X-ray detector 21 along the transverse direction QR with greater local sharpness.

Figure 7:
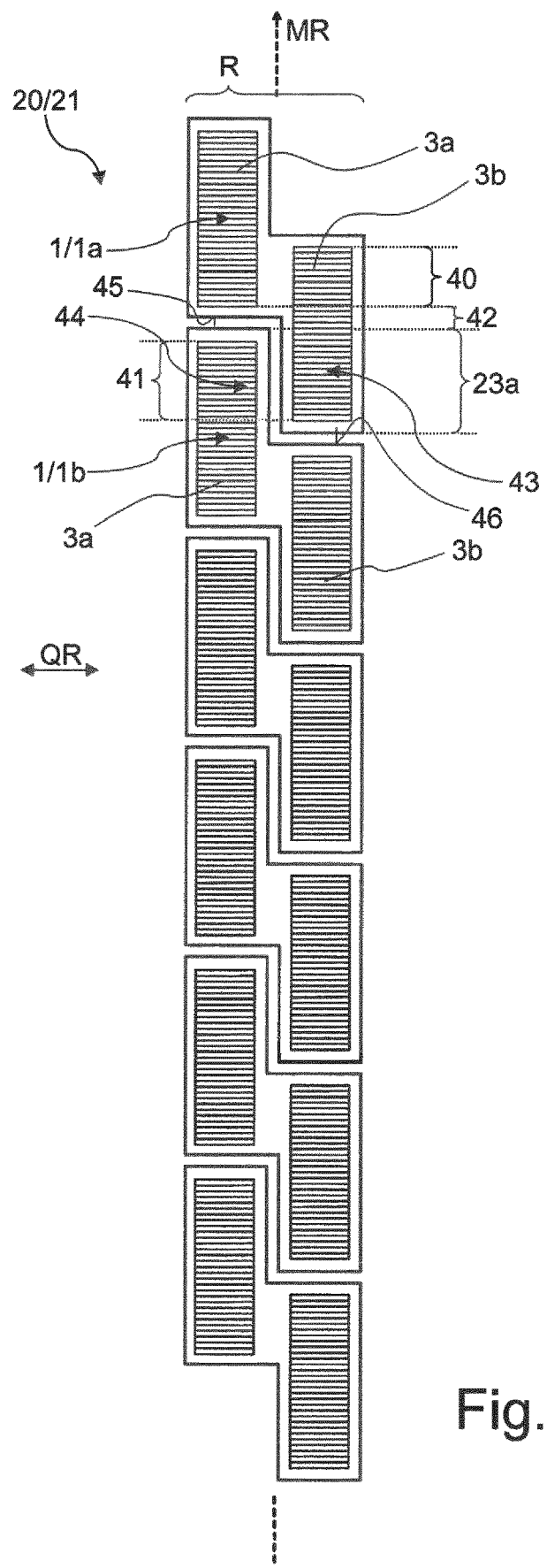
FIG. 7 shows a schematic plan view of a measurement arrangement according to the invention, in accordance with a fourth embodiment, having one row of interlocked detector modules, each having two active zones.

FIG. 7 shows a fourth embodiment of a measurement arrangement 20 according to the invention, similar to the measurement arrangement shown in FIG. 4. Once again the essential differences will be explained.

In this embodiment, the detector modules 1 are arranged successively in only one row R in the measurement direction MR; all the detector modules 1 are embodied identically and oriented identically (in the row R).

In order to set up the overlap regions 23a, the detector modules 1 are arranged in an interlocked fashion, that is to say that a projection 43, 44 (in relation to the measurement direction MR) of one respective detector module 1 engages in a recess 45, 46 (in relation to the measurement direction MR) of the respective other detector module 1, and vice versa (cf. detector modules 1a, 1b). The detector modules 1 are embodied in an S-like fashion for this purpose. In the overlap region 23a the projections 43, 44 of the detector modules 1 that are successive in the measurement direction MR in each case lie next to one another in the transverse direction QR.

Each detector module 1 here comprises two active zones 3a, 3b, which here overlap in a central region 40 in the measurement direction MR. Detector modules 1a, 1b that are successive in the measurement direction MR in each case form an overlap region 23a in which the detector modules 1a, 1b overlap in the measurement direction MR. In this case, the active zones (3b of detector module 1a and 3a of detector module 1b) of the different detector modules 1a, 1b also overlap in the measurement direction, with the result that double measurement regions 41 form in the overlap regions 23a.

It should be noted that here the overlapping detector modules 1a, 1b of an overlap region 23a also overlap in the transverse direction QR, that is to say that at a specific position along the transverse direction QR both the detector module 1a and the detector module 1b can be found (albeit in each case one of them outside the overlap region 23a, relative to a specific position in the transverse direction QR).

With regard to the double measurement regions 41 and the central regions 40, in which there is double determination of the X-ray intensity, a calibration is necessary in comparison with the singly measured positions in intermediate regions 42 in order to obtain an undistorted X-ray intensity measurement that is spatially resolved in relation to the measurement direction MR.

Figure 8:
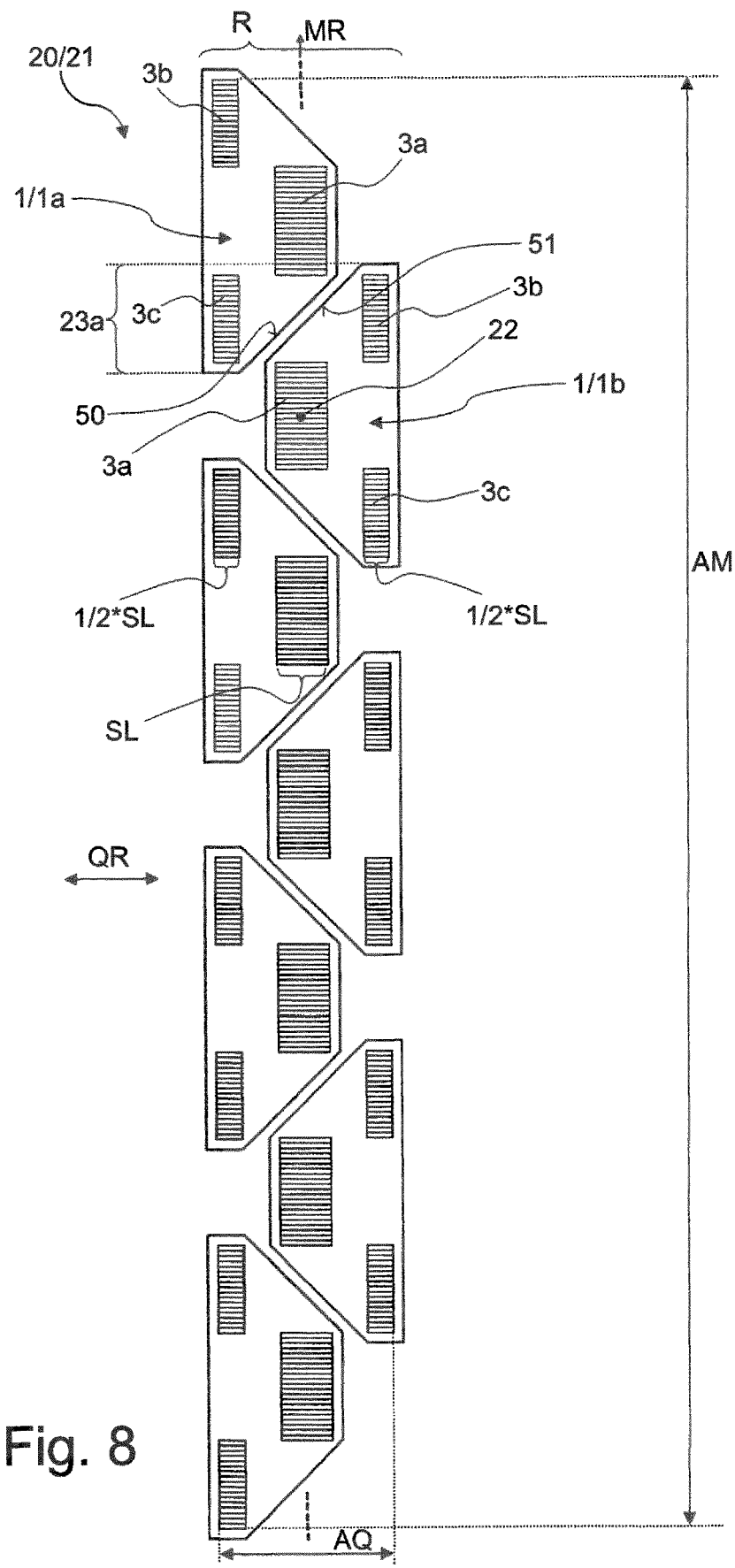
FIG. 8 shows a schematic plan view of a measurement arrangement according to the invention, in accordance with a fifth embodiment, having one row of wedge-shaped detector modules arranged in an alternating fashion, each having three active zones.

In the fifth embodiment of a measurement arrangement according to the invention as shown in FIG. 8, which in turn is similar to the embodiment in FIG. 7, and so only the most important differences will be explained, there are In the case of this design, the detector modules 1 are all embodied structurally identically, in each case with one large active zone 3a (main active zone) and two small active zones (secondary active zones, having half the width of the sensor strips in the transverse direction QR, but the same length in the measurement direction MR) 3b, 3c, wherein the active zones 3a, 3b, 3c of a detector module 1 are adjacent to one another in the measurement direction MR, but are offset with respect to one another in relation to the transverse direction QR. The detector modules 1 are embodied as substantially trapezoidal. The location of a respective detector module 1 can be described for example in each case by the center 22 of the large active zone 3a. The detector modules 1 are arranged successively in the measurement direction MR, in each case with the centers 22 of the successive detector modules 1 one below another, such that the detector modules 1 in this regard are arranged one behind another in a single row R; however, the orientation of the detector modules 1 alternates between successive detector modules 1a, 1b, such that the small active zones 3b, 3c are positioned in each case toward different sides (left and right respectively in FIG. 8). The successive detector modules 1a, 1b face one another with wedge-shaped edges 50, 51 (it should be noted that if the location of the detector modules 1 were defined differently, for instance in each case at the area centroid of the respective detector modules, the embodiment shown in FIG. 8 could also be interpreted as comprising two rows).

The offset of the successive detector modules 1a, 1b in the measurement direction MR is determined such that in a respective overlap region 23a the active zones 3c (of the upper detector module 1a) and 3b (of the lower detector module 1b) overlap exactly in the measurement direction. What is achieved as a result is that overall the same effective, total strip length SL in the transverse direction or at the sensor area is available at each position along the measurement direction MR.

For the extent of the totality of all the detector modules 1 of the X-ray detector 21 in the measurement direction MR, cf. extent AM, and in the transverse direction QR, cf. AQ, it holds true here that approximately AM=8.3*AQ.

It should be noted that here the overlapping detector modules 1a, 1b of an overlap region 23a once again also overlap in the transverse direction QR, that is to say that at a specific position along the transverse direction QR both the detector module 1a and also the detector module 1b can be found (partly with both detector modules 1a, 1b in the overlap region 23a, relative to a specific position in the transverse direction QR). In the overlap region 23a lower and upper portions of the overlapping detector modules 1a, 1b in each case lie next to one another in the transverse direction QR.

The sixth embodiment of a measurement arrangement 20 according to the invention as illustrated in FIG. 9 is embodied in a manner similar to the embodiment in FIG. 8, and so only essential differences will be explained.

The substantially trapezoidal detector modules 1 are once again arranged one behind another in one row R, wherein the orientation of the detector modules 1 alternates between successive detector modules 1a, 1b. Each detector module 1 has an active zone 3 having sensor strips 4a, 4b wherein the sensor strips 4a in a central region 60 have a uniform sensor element width SEB; the sensor strips 4a, 4b each contain only one continuous sensor element 30. The location of a detector module 1 can be defined by way of the center 22 of a respective central region 60 (here disregarding the sensor strips 4a that are already slightly offset in the transverse direction at the upper and lower edges). (It should be noted that if the location of the detector modules 1 were defined differently, for instance in each case at the area centroid of the respective detector modules, the embodiment shown in FIG. 9 could also be interpreted as comprising two rows).

The respectively successive detector modules 1a, 1b overlap in overlap regions 23a in the measurement direction MR, wherein the active zones 3 also overlap in double measurement regions 41. In the double measurement regions 41, however, the local sensor element widths of the sensor strips 4b of the active zones 3 are shortened, wherein at a respective position along the measurement direction MR as the total of the sensor element widths of the sensor strips 4b of the two active zones 3 of the detector modules 1a, 1b there results in each case a cumulative effective strip length SL in the transverse direction QR, wherein SL is equal to the uniform sensor element width SEB of the individual sensor strips 4a in the central region 60.

Figure 10:
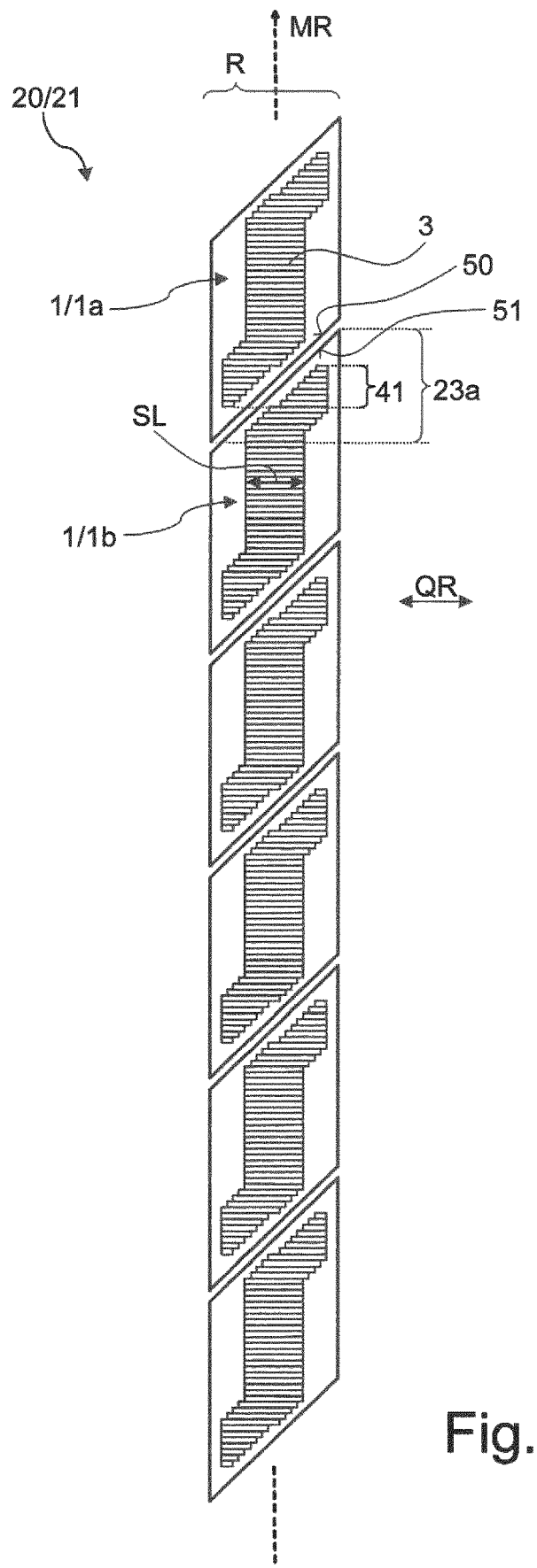
FIG. 10 shows a schematic plan view of a measurement arrangement according to the invention, in accordance with a seventh embodiment, having one row of wedge-shaped detector modules arranged in the same sense, each having one active zone.

A seventh embodiment of a measurement arrangement 20 according to the invention is illustrated in FIG. 10. Only the essential differences with respect to the embodiment in FIG. 9 will be explained.

The detector modules 1 here are once again arranged one behind another in one row. Overlap regions 23a of respectively adjacent detector modules 1a, 1b are set up in the region of wedge-shaped edges 50, 51. In this case, once again the active zones 3 of the detector modules 1a, 1b also overlap in double measurement regions 41. In the double measurement regions 41, once again the sensor strips 4b are embodied in a shortened fashion, wherein the cumulative, effective strip lengths SL in the transverse direction QR are identical everywhere.

In this embodiment, all the detector modules 1 are embodied identically and oriented identically in the sequence of the detector modules 1 in the row R. The detector modules 1 are embodied in each case in a parallelogram-like fashion.

FIG. 11 shows an extract from a measurement arrangement 20 according to the invention as illustrated in FIG. 4, which arrangement is covered by a mask 70. The measurement arrangement 20 is shown by itself on the left, and the measurement arrangement 20 with the mask 70 positioned in front is shown on the right. The mask 70 is produced from a material having poor transmission for X-ray radiation, for instance lead.

The totality of the active zones 3 of the detector modules 1 in both rows R1, R2 has a full width VB in the transverse direction QR. As a result of the arrangement of the mask 70 in front of the X-ray detector 21, the full width VB of the totality of the active zones 3 is restricted to a smaller, then still usable width NB in the transverse direction QR. In the exemplary embodiment shown, only approximately ¼ of the respective sensor element width SEB (or strip length) in the transverse direction QR remains unshaded. The mask 70 is positioned such that equal proportions of the active zones 3 of both rows R1, R2 (or the detector modules 1 that overlap in the overlap regions in relation to the measurement direction MR) remain unshaded, that is to say that an X-ray measurement without gaps in relation to the measurement direction MR can be effected even with the mask 70.

By means of the mask 70, a locationally more accurate X-ray diffraction measurement in relation to the transverse direction QR can be effected as necessary, for instance if the X-ray detector 21 is pivoted/rotated during the measurement (for example in order to determine mechanical stresses or preferred directions/textures in the measurement sample).

FIG. 12 shows a measurement set-up 90 for the invention, comprising a measurement arrangement 20 according to the invention, similar to that illustrated in FIG. 9.

An X-ray source 94 directs an X-ray beam 95 at a sample position 91, at which a measurement sample 96 is arranged. The measurement sample 96 interacts with the X-ray radiation, in particular through diffraction at the lattice structures in the material of the measurement sample 96. The measurement sample 96 is pulverulent, for example, and so radiation diffracted by the measurement sample emanates in so-called Debye cones, with the axis of the Debye cones corresponding to the direction of propagation of the X-ray beam 95. Possible intersection rings of Debye cones around a sphere around the sample position 91, here with a radius corresponding to the circular arc 92, are indicated in a dotted manner ("Debye rings").

The detector modules 1 of an X-ray detector 21 are arranged on a circular arc 92 around the sample position 91. The detector modules 1 are arranged in an overlapping fashion (as described above) along the circular arc 92, which simultaneously defines the (local) measurement direction MR at each detector module 1. The individual detector modules 1 are each embodied on a planar substrate 2 oriented perpendicular to the local connection direction VR with respect to the sample position 91 (depicted by way of example for detector module 1a). The local connection direction VR runs from the sample position 91 to the respective substrate 2 or to the detector module 1 (or the center thereof). At the respective detector module 1 the measurement direction MR, the transverse direction QR and the connection direction VR are approximately perpendicular to one another.

If the X-ray beam 95 is generated with a line focus, the long direction of the X-ray beam should lie parallel to the transverse direction QR and the short direction should lie perpendicular thereto (that is to say in the vertical direction here), in order to set up the redundancy—implicit in the extended X-ray beam—of the measurement information along the transverse direction.

FIG. 13 illustrates one possible application of a measurement set-up 90, similar to that shown in FIG. 12.

On a conveyor belt 100 various measurement samples 96 run toward the sample position 91 along a conveying direction 101; one measurement sample 96 has also just arrived here at the sample position 91. The X-ray beam 95 irradiates the measurement sample 96 at the sample position 91 for a short time (in accordance with the speed of the conveyor belt 100), and diffracted X-ray radiation associated with the measurement sample 96 is registered at the X-ray detector 21 of the measurement arrangement 20. By way of example, diffracted X-ray radiation of the Debye cone 102 is measured at the detector module 1f.

Gapless, one-dimensional diffraction information from the measurement sample 96 is obtained over the entire section of the circular arc 92 that is covered by the detector modules 1 overlapping in the measurement direction MR; all the detector modules 1 carry out measurement simultaneously in this case. In particular, it is not necessary to move the X-ray detector 21 for obtaining gapless diffraction information.

As a result, the measurement is fast enough also to provide continuous quality control of measurement samples 96 passing through ("online quality control"). By way of example, crystalline impurities in a measurement sample 96 can be identified in a simple and rapid manner by way of the diffraction information, for instance in order to sort out said measurement sample from a production process in the event of an impurity being present.

In the case of the measurement set-up 90 shown in FIG. 13, the X-ray source 94 and the X-ray detector 21 (including the sample position 91) are arranged in a stationary fashion, which can be set up particularly easily. Alternatively, it is also possible to set up the X-ray detector 21 such that it is pivotable about a rotation axis DA1 running perpendicular to the beam direction of the X-ray beam 95, in order to obtain additional diffraction information. Likewise, it is alternatively possible to set up the X-ray detector 21 such that it is pivotable about a rotation axis DA2 running along the beam direction of the X-ray beam 95, in order to obtain additional diffraction information. In particular, the pivotability about a rotation axis DA1 or DA2 makes it possible to carry out stress measurements or else texture measurements on the measurement sample 96. If the X-ray detector 21 is rotated during the measurement, an X-ray beam 95 with a point focus is preferred, optionally wherein a mask can be used as well.

FIG. 14 shows, in a schematic side view, a third measurement set-up 90 for the invention, comprising a measurement arrangement 20 according to the invention similar to that illustrated in FIG. 4. In this case, the measurement arrangement 20 comprises an X-ray detector 21 having a plurality of detector modules 1 arranged in an overlapping fashion in two rows in relation to the measurement direction MR (as described above); detector modules 1a of the first row are illustrated in a dashed manner here, and detector modules 1b of the second row are illustrated in a dotted manner here. The first and second rows here lie one behind another in relation to the transverse direction (which here runs perpendicular to the plane of the drawing). The detector modules 1 register diffracted X-ray radiation from a measurement sample 96 at the sample position 91, which is illuminated by an X-ray beam 95 from an X-ray source 94.

The measurement direction MR, along which the detector modules 1 are arranged successively and along which the X-ray detector provides a spatial resolution, here runs along a straight line oriented vertically in the design shown. This design is particularly simple, and allows a flexible variation of the distance 110 between the sample position 91 or measurement sample 96 and the X-ray detector 21 (measured here along the direction of propagation of the X-ray beam 95). It should be noted that the transverse direction (running perpendicular to the plane of the drawing) at each detector module 1 runs perpendicular to the local measurement direction MR and perpendicular to the local connection direction with respect to the sample position; however, the local measurement direction MR runs with in some instances considerable deviations from an angle of 90° relative to the local connection direction with respect to the sample position 91.

Generally (in the case of a straight measurement direction or else a curved measurement direction/measurement direction in the shape of a circular arc) it holds true that a typical distance 110 between sample position 96 and X-ray detector 21 is 150-300 mm. Typical extents AQ of the totality of the active zones in the transverse direction are 5-20 mm. The energy of the X-ray radiation used is usually around 4-30 keV, for specific applications also up to 60 keV or even up to 150 keV. In the context of the invention, detector modules are arranged successively in the measurement direction and next to one another in the transverse direction, and in particular not one behind another in relation to the connection direction with respect to the sample position.

In summary, the present invention proposes embodying an X-ray detector (21) with a plurality of detector modules (1, 1a-1g), each comprising dead zones (6) without X-ray sensitivity and active zones (3, 3a-3c) with X-ray sensitivity that is spatially resolved in a measurement direction (MR), wherein the detector modules (1, 1a-1g) are embodied successively and in an overlapping fashion along the measurement direction (MR), such that in overlap regions (23a-23e) the dead zone (6) of one detector module (1, 1a-1g) is bridged by an active zone (3, 3a-3c) of another detector module (1, 1a-1g). The overlapping detector modules (1, 1a-1g) are arranged next to one another in the transverse direction (QR) in the overlap regions (23a-23e), wherein the transverse direction (QR) runs transversely with respect to the local measurement direction (MR) and transversely with respect to a local connection direction (VR) with respect to a sample position (91). The X-ray detector (21) makes it possible, in a simple manner, to obtain gapless, one-dimensional measurement information, in particular X-ray diffraction information, from a measurement sample (96) at the sample position (91).

LIST OF REFERENCE SIGNS

1 Detector module
1a-1g Detector module
2 Substrate
3 Active zone
3a-3c Active zone
4a-4d Sensor strip
5 Longitudinal side (sensor strip)
6 Dead zone
7a-7b Measurement channel
8a-8b Charge pulse
9 Evaluation electronics
10 Window
11a-11b Electrode
12a-12b Measurement channel
20 Measurement arrangement
21 X-ray detector
22 Center
23a-23e Overlap region
30 Sensor element
40 Central region
41 Double measurement region
42 Intermediate region
43 Projection
44 Projection
45 Recess
46 Recess
50 Wedge-shaped edge
51 Wedge-shaped edge
60 Central region
70 Mask
71 Slot
90 Measurement set-up
91 Sample position
92 Circular arc around sample position
94 X-ray source
95 X-ray beam
96 Measurement sample
100 Conveyor belt
101 Conveying direction
102 Debye cone
110 Distance from sample position to X-ray detector
AB Spacing of successive detector modules
AM Extent of totality of the active zones of all the detector modules in the measurement direction
AQ Extent of totality of the active zones of all the detector modules in the transverse direction
Ba, Bb, Bc Slot width in the transverse direction
E First detector modules
LM Length of detector module of the first row
L1 Length of active zone of a detector module of the first row
L2 Spacing of active zones of successive detector modules of the second row
MR Measurement direction
NB Usable width
QR Transverse direction
R (Single) row
R1 First row
R2 Second row
R2a, R2b Second rows
SEB Width of a sensor element in the transverse direction
SEH Height of a sensor element in the measurement direction
SL Strip length in the transverse direction
VB Full width
VR Connection direction with respect to the sample position
Z Second detector modules

The invention claimed is:

1. A measurement arrangement for X-ray radiation, comprising:
a sample position illuminable by an X-ray beam, and
an X-ray detector for detecting the X-ray radiation emanating from the sample position, comprising a plurality of detector modules,
wherein the detector modules each have at least one active zone, in which X-ray radiation can be detected, and a dead zone, in which no X-ray radiation can be detected and which encloses the at least one active zone, wherein the detector modules are arranged successively in groups and/or individually in relation to a measurement direction, wherein the active zones of the detector modules are configured in each case for X-ray radiation detection which is spatially resolved in the measurement direction, wherein the totality of the active zones of all the detector modules of the X-ray detector has an extent AM in the measurement direction and an extent AQ in a transverse direction, where AM≥5*AQ, wherein the transverse direction runs locally transversely with respect to the measurement direction and locally transversely with respect to a connection direction with respect to the sample position, wherein at least one portion of the detector modules that are successive in relation to the measurement direction forms overlap regions in which in each case at least two detector modules overlap in the measurement direction and are arranged next to one another in the transverse direction, wherein the active zones of the detector modules in the overlap regions are directly adjacent to one another in the measurement direction or overlap in the measurement direction, such that the totality of the active zones of the detector modules enables the X-ray radiation emanating from the sample position to be measured without gaps in the measurement direction, and wherein the detector modules are arranged along a circular arc around the sample position in an overlapping fashion, wherein the circular arc defines the local measurement direction at each detector module, and the detector modules are each embodied on a planar substrate oriented perpendicular to the local connection direction with respect to the sample position and wherein at the respective detector module the measurement direction, the transverse direction and the connection direction are approximately perpendicular to one another.

2. The measurement arrangement as claimed in claim 1, wherein the detector modules comprise first detector modules and second detector modules, wherein the first detector modules are arranged one behind another in a first row in the measurement direction, and the second detector modules are arranged one behind another in at least one second row in the measurement direction, wherein the first row and the at least one second row are arranged next to one another in relation to the transverse direction, and wherein the first detector modules, relative to the second detector modules, are arranged offset relative to one another in the measurement direction, such that the active zones of the second detector modules overlap dead zones of the first detector modules, which in the measurement direction are not overlapped by active zones of the first detector modules, in the measurement direction.

3. The measurement arrangement as claimed in claim 2, wherein, for a first length L1 in the measurement direction, over which the active zone or active zones of a first detector module extend(s), and for a second length L2 in the measurement direction, which lies between the active zones of second detector modules which are successive in the at least one second row in the measurement direction and which both form an overlap region with the first detector module, L2≥0.2*L1.

4. The measurement arrangement as claimed in claim 2, wherein the first row and the at least one second row comprise at least one spacing-exhibiting row in which the detector modules that are successive in the measurement direction are arranged in a manner spaced apart from one another with a spacing AB in relation to the measurement direction.

5. The measurement arrangement as claimed in claim 1, wherein the detector modules are arranged one behind another in only one row in the measurement direction, wherein in the overlap regions the detector modules also overlap in the transverse direction.

6. The measurement arrangement as claimed in claim 1, wherein the detector modules are embodied as approximately wedge-shaped and/or interlocked in the overlap regions.

7. The measurement arrangement as claimed in claim 1, wherein in the overlap regions the active zones of the overlapping detector modules overlap in double measurement regions in the measurement direction.

8. The measurement arrangement as claimed in claim 7, wherein the active zones of the detector modules are embodied in a shortened fashion in relation to the transverse direction in the double measurement regions in comparison with outside the double measurement regions.

9. The measurement arrangement as claimed in claim 1, wherein in the overlap regions the active zones of the overlapping detector modules do not overlap in the measurement direction.

10. The measurement arrangement (20) as claimed in claim 1, wherein the at least one active zone of a respective detector module has a plurality of sensor strips which are successive in the measurement direction and which extend at least substantially in the transverse direction.

11. The measurement arrangement as claimed in claim 10, wherein at all positions along the measurement direction a cumulative effective strip length in the transverse direction of the sensor strips of all the detector modules which form a sensor strip at the respective position is identical.

12. The measurement arrangement as claimed in claim 10, wherein at least one portion of the sensor strips (4a-4d) has at least one sensor element having a sensor element aspect ratio SEAV≥3, wherein SEAV=SEB/SEH where SEB is a width of the sensor element in the transverse direction, and SEH is a height of the sensor element in the measurement direction.

13. The measurement arrangement as claimed in claim 10, wherein the sensor strips are embodied as approximately rectangular, wherein the longitudinal sides of the sensor strips extend in the transverse direction, and wherein the longitudinal sides of sensor strips of a respective active zone that are successive in the measurement direction lie against one another.

14. The measurement arrangement as claimed in claim 1, wherein in the overlap regions the active zones of the overlapping detector modules overlap in double measurement regions in the measurement direction, wherein the active zones of the detector modules are embodied in a shortened fashion in relation to the transverse direction in the double measurement regions in comparison with outside the double measurement regions, wherein the at least one active zone of a respective detector module has a plurality of sensor strips which are successive in the measurement direction and which extend at least substantially in the transverse direction, and wherein at all positions along the measurement direction a cumulative effective strip length in the transverse direction of the sensor strips of all the detector modules which form a sensor strip at the respective position is identical.

15. The measurement arrangement as claimed in claim 1, wherein the detector modules are embodied as semiconductor detector modules.

16. The measurement arrangement as claimed in claim 1, wherein a mask is arranged in front of the detector modules, which mask shades at least partial areas of at least one portion of the active zones of the detector modules with regard to the sample position and thereby reduces a usable width of the totality of the active zones in the transverse direction compared with a full width of the totality of the active zones without shading.

17. The use of a measurement arrangement as claimed in claim 1 for measuring a measurement sample (96),
    wherein the measurement sample is irradiated by an X-ray beam and is arranged at the sample position or is imaged onto the sample position by an X-ray optical unit, and
    wherein measurement data of the detector modules which were measured simultaneously are combined to form a one-dimensional total measurement data set having no gaps in relation to the positions along the measurement direction,
    wherein at positions along the measurement direction in which, in an overlap region of at least two detector modules, there lies only a dead zone of at least one of the overlapping detector modules, measurement data of at least one other detector module of the overlapping detector modules which has an active zone at this position are used in order to determine the continuous total measurement data set.

18. The measurement arrangement as claimed in claim 3, wherein $L2 \geq 0.4 \ast L1$.

19. The measurement arrangement as claimed in claim 4, wherein $AB \geq 0.3 \ast LM$, where LM is a length of the detector modules in the spacing-exhibiting row in the measurement direction.

20. The measurement arrangement as claimed in claim 12, wherein the at least one portion of the sensor strips includes each sensor strip.

* * * * *